United States Patent
Watanabe et al.

(10) Patent No.: US 6,913,815 B2
(45) Date of Patent: Jul. 5, 2005

(54) PLASTICS-COVERED METAL PLATE FOR CAR

(75) Inventors: Tadashi Watanabe, Hiratsuka (JP); Tadayoshi Hiraki, Odawara (JP); Akira Tominaga, Chigasaki (JP); Takeshi Yawata, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 412 days.

(21) Appl. No.: 09/779,546

(22) Filed: Feb. 9, 2001

(65) Prior Publication Data
US 2001/0038216 A1 Nov. 8, 2001

(30) Foreign Application Priority Data
Feb. 10, 2000 (JP) ........................................ 2000-033180

(51) Int. Cl.$^7$ ........................... B32B 5/12; B32B 27/04; B29D 30/00; B65B 33/00; C03B 29/00
(52) U.S. Cl. ...................... 428/212; 428/220; 428/416; 428/418; 428/457; 296/8; 296/10; 296/164; 296/181.2; 29/897.2; 180/89.1; 204/471; 156/89.11; 156/123; 156/390; 427/156; 427/405

(58) Field of Search ................................. 428/212, 416, 428/418, 457, 220; 205/50; 296/8, 10, 164, 181.2; 29/897.2; 180/89.1; 204/471; 427/156, 405; 156/89.11, 123, 390

(56) References Cited

U.S. PATENT DOCUMENTS 4,009,312 A * 2/1977 Hayashi et al. ............. 428/213
5,215,826 A   6/1993 Shimanski et al.
6,565,966 B2 * 5/2003 Hiraki et al. ................ 428/332

* cited by examiner

Primary Examiner—Rena Dye
Assistant Examiner—Lawrence Ferguson
(74) Attorney, Agent, or Firm—Wenderoth, Lind & Ponack, L.L.P.

(57) ABSTRACT

The present invention provides a plastics-covered metal plate excellent in chipping resistance, corrosion resistance etc. made by covering one surface or both surfaces of a metal plate with at least two kinds of plastics layers whose rates of elongation are different and a process of covering a car body by using said covered metal plate.

16 Claims, No Drawings

PLASTICS-COVERED METAL PLATE FOR CAR

The present invention relates to a metal plate for car body which is covered with at least two kinds of plastics layers whose rate of elongation is different each other, and further includes a process of forming a car body, which is excellent in chipping resistance, corrosion resistance etc., by using the covered metal plate.

In a car body of a normal or small passenger car etc., the portion constituted mainly with sheet metal without riggings such as engine or chassis is called shell body. Usually the shell body consists of a main body, consisting of underbody, side member, roof, cowl, upper back, lower back etc., and outer cover parts such as hood, front balance, front fender, cowl louver, door, luggage (back door) etc.

Up to the present, in order to form these main body and outer cover parts, a metal plate is cut and shaped in the size and shape of each constituting part and they are assembled into a shell body, which is dipped into a cationic electrodeposition paint bath to form an undercoat coating film by electrodeposition coating on the surface, backside, edge surface portion etc. of the metal plate. Then the outer surface portions are coated with intermediate paint, top-coat paint etc.

Recently, however, in the field of car body coating, operation step saving, energy saving and reduction of CO2 in the coating line are strongly desired. Moreover, further improvement in throwing power of electrodeposition paint to edge surface portion, and chipping resistance, corrosion resistance etc. of the total coating film is required. In order to improve the chipping resistance, there has been proposed to coat a barrier paint to form a viscoelastic coating film between the layers of these coating films. This has, however, disadvantages that the number of coating steps increases and the manufacturing cost increase, too.

The present inventors have repeatedly conducted studies to solve the problems in the coating of a car body as mentioned above. As a result, this time, they found that a metal plate, covered with more than two kinds of plastics layers whose rates of elongation are different, is excellent in chipping resistance, corrosion resistance etc. and the above-mentioned disadvantages can be dissolved by using it for a part or total of the car body and completed the present invention.

Thus, according to the present invention there is provided a plastics-covered metal plate for car body characterized by being made through covering one surface or both surfaces of a metal plate with at least two kinds of plastics layers whose rate of elongation is different each other (hereinafter referred to as the present covered metal plate).

Further, according to the present invention there is provided a process of covering a car body characterized by forming a shell body of a car body by using partly or totally the present covered metal plate and then by electrodeposition coating the portion of the shell body where metal is exposed (hereinafter referred to as the present covering process).

Then, the plastics-covered metal plate for car body and the process of covering a car body of the present invention are described in more detail.

The present covered metal plate can be used mainly as constituting element of a car body of normal and small passenger car, but can be applied also to truck, bus, motorcycle, vehicle with special kind of equipment etc. in the same manner.

As a metal plate to be covered with a plastics layer according to the present invention there can be used those which have been used for a car body until now in the same manner and there can be mentioned specifically, for example, metal plate made of iron, steel, stainless steel, aluminium, copper and alloys containing these metals, and further metal plates made by plating their surface with zinc, zinc/nickel, iron etc. They can be used in the shape of coils or cut plates. The thickness of the metal plates is suitably in the range of usually 0.3–2 mm, particularly 0.5–1 mm. It is preferable that the surface of these metal plates is treated suitably by grinding, degreasing, treatment with phosphate etc. in order to improve the adhesivity with a plastics layer, corrosion resistance etc.

The present covered metal plate is made by covering one surface or both surfaces of the metal plate as mentioned above with at least two kinds of plastics layers whose rate of elongation is different each other.

Here the "rate of elongation" of a plastics layer means the value (%) calculated by the formula: $\{(L-20)/20\} \times 100$ wherein L mm is the length of a film strip, which has been made by forming a film of the same material and the same thickness as those of said plastics layer and by cutting out a film strip of 20 mm long and 5 mm wide, at the time of breakage when being drawn at the speed of 20 mm a minute at +20° C. For example, when a film strip of 20 mm long is broken at the time when it is stretched to 30 mm, its rate of elongation is 50%.

The present covered metal plate is obtained, for example, by laminatedly covering a metal plate with a plastics layer (A) whose rate of elongation is relatively smaller and a plastics layer (B) whose rate of elongation is larger. The order of covering with the plastics layers (A) and (B) is not particularly restricted but can be selected optionally according to the application purpose etc. of the present covered metal plate. It is particularly preferable, however, that the plastics layer (B) whose rate of elongation is larger is generally placed at the nearer side to the metal plate and the plastics layer (A) whose rate of elongation is smaller is placed thereon (at the farther side from the metal plate), that is, they are laminated in the order of metal plate/plastics layer (B)/plastics layer (A).

The difference between the rate of elongation of the plastics layer (A) and the rate of elongation of the plastics layer (B) is not strictly limited. It is preferable, however, that the rate of elongation of the plastics layer (B) is larger than that of the plastics layer (A) generally by at least 10%, preferably 50–200% and more preferably 80–150%. The rate of elongation of the plastics layer (A) itself is preferably in the range of generally 1–100%, particularly 5–70% and more particularly 10–50%.

As modes of covering the plastics layers whose rate of elongation is different each other to one surface or both surfaces of a metal plate in the present covered metal plate there are mentioned, for example, the following.

1) A covered metal plate made by covering with 2-layered multilayered plastics layer made by covering with the plastics layer (B) with larger rate of elongation and then the plastics layer (A) with smaller rate of elongation successively from the side of the metal plate.

2) A covered metal plate made by covering with 3-layered multilayered plastics layer made by covering with the plastics layer (A), the plastics layer (B) and the plastics layer (A) successively from the side of the metal plate.

The oxygen permeability of the plastics layer (A) in its single coating film form at 25° C. is preferably less than $10^{-11}$ cm$^3$.cm/cm$^2$.sec.cmHg, particularly less than $10^{-12}$ cm$^3$.cm/cm$^2$.sec.cmHg, because the corrosion resistance of the present covered metal plate to be obtained is further improved.

As a plastics material to form the plastics layer having the above-mentioned rate of elongation and occasionally the above-mentioned oxygen permeability there can be used per se known substances and there can be mentioned, for example, thermoplastic resins such as polyolefin resin such as polyethylene, polypropylene etc., polyester resin such as polyethylene terephthalate (PET) etc., polycarbonate resin, epoxy resin, vinyl acetate resin, vinyl chloride resin, fluorine-containing resin, polyvinyl acetal resin, polyvinyl alcohol resin, polyamide resin, polystyrene resin, acrylic resin, polyurethane resin, phenolic resin, polyether resin, cellulose type resin etc. Among them, particularly polyester resin, polyurethane resin and vinyl chloride resin are preferable.

These plastics can contain, as necessary, additives such as color pigment, extender pigment etc. Adjustment of the rate of elongation and oxygen permeability of the plastics layer can be easily conducted by changing the kind of plastics, compounding ratio of additives such as pigment etc.

Covering of a metal plate with a plastics layer can be conducted by per se known processes and there can be mentioned, for example, a process of previously laminating the above-mentioned plastics layer (A) and the plastics layer (B) and then sticking it to the metal plate, a process of successively laminating one layer after another to the metal plate etc.

More specifically, covering of a metal plate with a plastics layer can be conducted, for example, by sticking to the metal plate plastics in film shape or sheet shape previously formed by such a process as extrusion molding, injection molding, calender molding, compression molding etc.; by pressure-sticking to the metal plate thermally molten plastics extruded in film shape or sheet shape; or by adhering to the metal plate plastics in powder form by such a process as fluidized bed coating, electrostatic coating etc. and then melting by heating, etc. Covering with plastics layer is conducted at least to the surface of the metal plate placed at the outside of a car body, but it is possible to conduct it to both sides, when desired. It is also possible to treat the surface of these plastics by corona discharge, plasma, flame etc. prior to lamination.

The thickness of each plastics layer covering the metal plate is not strictly limited but can be changed according to the location where the present covered metal plate is applied. It is preferable in the range of usually 1–100 $\mu$m, particularly 5–50 $\mu$m and the total thickness of the laminated multilayered plastics layer is suitable in the range of usually 5–120 $\mu$m, particularly 7–100 $\mu$m, more particularly 10–50 $\mu$m.

In order to increase the adhesivity between the metal plate and plastics layer and between plastics layers each other when covering the metal plate with plastics layer it is preferable to previously coat an adhesive to the metal plate and/or plastics layer. As such an adhesive there can be mentioned, for example, thermosetting or thermoplastic adhesives containing curing agent and one or more than 2 kinds of resins selected from bisphenol type epoxy resin, resol type epoxy resin, acrylic resin, aminoplast resin, polyester resin, urethane resin, polysiloxane resin etc. Further, there can be used as adhesive triazinethiol type compounds such as 2,4,6-trimercapto-s-triazine, 2-dibutylamino-4,6-dimercapto-s-triazine, 2,4,6-trimercapto-s-triazine-monosodium salt, 2,4,6-trimercapto-striazine-trisodium salt etc.

The present covered metal plate can be prepared by covering one surface or both surfaces of a metal plate, which has been suitably treated by grinding, degreasing, phosphate treatment etc., with a plastics layer (A), plastics layer (B) etc. by suitably using an adhesive. As the plastics-covered portion of the present covered metal plate is excellent in chipping resistance, corrosion resistance etc., they can be favorably used as material for car body which strongly requires such performances.

Thus, according to the present invention, there is provided a process of covering a car body characterized by forming a shell body of a car body using partly or totally the present covered metal plate mentioned above and then covering the portion of the shell body where metal is exposed by electrodeposition coating (hereinafter referred to as the present covering process).

As the present covering process there can be mentioned representatively a process wherein main body and outer cover parts (car parts) of a car body are prepared by using the present covered metal plate prepared as mentioned above, cutting, shaping and combining it and then a shell body is formed by assembling them (hereinafter referred to as the present covering process 1) and a process wherein outer cover parts (car parts) of a car body are prepared by using the present covered metal plate prepared, cutting, shaping and combining it and then a shell body is formed by assembling them with a main body (hereinafter referred to as the present covering process 2).

Shell body is the part constituted mainly with sheet metal without riggings such as engine or chassis in a car body. The main body thereof is constituted mainly with underbody, side member, roof, cowl, upper back, lower back etc. and other outer cover parts consist mainly of hood, front balance, front fender, cowl louver, door, luggage (back door) etc., which are called as car parts.

Underbody here means the floor portion of the cabin, trunk room etc. and is named generically, including front underbody, front floor, rear floor etc. Side member forms the side of a cabin joining with a front body, roof panel, underbody etc. and prevents the car from bending and/or twisting. Cowl is a panel combining left, right, front and rear pillars. Upper back is a panel combining left and right quarter panels (rear fenders) at the back portion of a car body and forming outer surface of the car body.

In the present covering process 1, in order to form each of the above-mentioned respective parts constituting the shell body, the present covered metal plate prepared as mentioned above is cut into the objected shape and size, pressure-shaped by a press etc. and combining them, as necessary, by adhesive, welding, bolting etc. to prepare underbody, side member, roof, cowl upper back, lower back etc. of the main body and further parts such as hood, front balance, front fender, cowl louver, door, luggage etc. of the outer cover parts (car parts).

These cutting, shaping and combining can be conducted by per se known processes. Then these respective parts formed in such a manner by using the present covered metal plate are combined and assembled to form a main body to which outer cover parts (car parts) such as hood, front balance, front fender, cowl louver, door, luggage etc. are fitted.

At least the outside of the shell body formed in such a manner by using plastics-covered metal plate is covered with a plastics layer and the cut edge surface portion of the metal plate has an exposed metal portion. Though it is preferable that its backside is covered with plastics, sometimes metal portion is exposed.

In the present covering process 2, for the main outer surface portion of a car body, the present covered metal plate prepared as mentioned above is cut, shaped and combined to prepare outer cover parts (car parts) such as hood, front balance, front fender, cowl louver, door, luggage etc. and these car parts are fitted to the main body of a car body previously assembled to form a shell body. Among them, the preparation of outer cover parts (car parts) using the present covered metal plate can be conducted in the same manner as in the present covering process 1.

In the present covering process 2, most or all of the car parts constituting the outer cover parts are prepared by using the present covered metal plate mentioned above. For example, about each part such as hood, front balance, front fender, cowl louver, door, luggage (back door) etc., in order to form them, the present covered metal plate is cut into the objected shape and size, pressure-shaped by a press etc. and combining them by adhesive, welding, bolting etc. to prepare each part such as hood, front balance etc. These cutting, shaping and combining can be conducted by per se known processes. At least the outside of the outer cover parts formed in such a manner is covered with a plastics layer and the cut edge surface portion of the metal plate has an exposed metal portion. Its backside may be uncovered and have exposed metal, or covered with plastics.

In the present covering process 2, the main body constituted with underbody, side member, roof, cowl upper back, lower back etc., to which these car parts are fitted, is prepared usually by cutting, shaping and processing uncoated metal plate by known processes without using the present covered metal plate, and by assembling them. To such a main body prepared by using uncoated metal plate, the outer cover parts (car parts) prepared by using the present covered metal plate are fitted to form a shell body.

In such a shell body prepared by the present covering process 1 and the present covering process 2, in case of the present covering process 1 the cut edge surface portion of the present covered metal plate has naturally an exposed metal surface and its backside occasionally has it, and in case of the present covering process 2 the cut edge surface portion of the present covered metal plate, surface of the main body and further their backside surface may have an exposed metal surface, therefore it is preferable to cover these metal exposed portions by electrodeposition coating.

As a paint to be used for electrodeposition coating an electrodeposition paint of either anionic type or cationic type can be used. Generally, however, it is preferable to use a cationic electrodeposition paint with excellent corrosion resistance.

As a cationic electrodeposition paint a per se known substance can be used. For example, anaqueous paint containing a base resin having hydroxyl group and cationizable group and a blocked polyisocyanate compound (crossinking agent) can be favorably used. As the base resin here a per se known substance can be used and there can be mentioned, for example, reaction product of polyepoxy resin and cationizing agent, acid-protonized product of polycondensate of polycarboxylic acid and polyamine (cf. U.S. Pat. No. 2,450,940), acid-protonized product of polyadduct of polyisocyanate compound and polyol and mono- or polyamine, acid-protonized product of copolymer of acrylic type or vinyl type monomer containing hydroxyl group and amino group (cf. Japanese Patent Publication No. 12395/1970=U.S. Pat. No. 3,455,806), Japanese Patent Publication No. 12396/1970=U.S. Pat. No. 3,454,482), acid-protonized product of adduct of polycarboxylic acid resin and alkylene imine(cf. U.S. Pat. No. 3,403,088). Among them, the resin obtained by reacting a cationizing agent to an epoxy resin obtained by reaction of polyphenol compound and epichlorohydrin is particularly preferable, because it forms a coating film excellent in corrosion resistance. As the above-mentioned cationizing agent there can be mentioned, for example, amine compounds such as primary amine, secondary amine, tertiary amine, polyamine etc. It may be possible to form a cationic group by acid-protonizing the basic group formed by using basic compound such as ammonia, hydroxylamine, hydrazine, hydroxyethylhydrazine, N-hydroxyethylimidazoline etc. as cationizing agent and reacting with epoxy group.

Blocked polyisocyanate compound as a crosslinking agent is a polyisocyanate compound whose isocyanate groups are substantially all blocked with volatile blocking agent, which dissociates when heated higher than a designated temperature (for example, baking temperature of the coating film) and the regenerated isocyanate group participates in the crosslinking reaction with the base resin.

Polyisocyanate compound is a compound having at least two free isocyanate groups in the molecule and there can be mentioned per se known aliphatic diisocyanate, alicyclic diisocyanate, aromatic diisocyanate; urethanization adduct, biuret type adduct, isocyanuric ring type adduct of these polyisocyanate compounds etc. As a blocking agent there can be used per se known blocking agents of phenol type, alcohol type, active methylene type, mercaptan type, acid amide type, imide type, amine type, imidazole type, urea type, carbamic acid type, imine type, oxime type, sulfurous acid type, lactam type etc.

A cationic electrodeposition paint can be prepared, after neutralizing cationic groups in the base resin with an acid compound such as acetic acid, formic acid, lactic acid, phosphoric acid etc., by mixing with a blocked polyisocyanate compound in water. The pH at the time of coating is suitably in the range of generally 3–9, particularly 5–7 and the solid content concentration in the range of 5–30% by weight.

To a cationic electrodeposition paint there can be suitably compounded, as necessary, a curing catalyst having rust preventive properties such as hydroxide, oxide, organic acid salt, inorganic acid salt etc. of a metal selected from aluminium, nickel, zinc, strontium, lead, zirconium, molybdenum, tin, antimony, lanthanum, tungsten, bismuth etc.; extender pigment, color pigment, rust preventive pigment, antisettling agent etc.

In the present covering process the shell body prepared as mentioned above is dipped into a cationic electrodeposition paint bath as a cathode and, by conducting an electrodeposition coating, for example, for about 1–about 10 minutes of passing a current, at about 20–about 35° C. of bath temperature and 100–400V of voltage, an electrodeposition coating film is deposited to an exposed metal portion of the shell body, for example, whole surface of the main body, cut edge surface portion of metal plate and the backside surface portion which is not covered with plastics layer. The film thickness of the electrodeposition coating film is preferably about 10–about 40 μm based upon a cured coating film. After coating the shell body is drawn up from the electrodeposition paint bath, washed suitably with water and heated to about 100–about 200° C., particularly about 120–about 180° C. to cure the electrodeposition coating film and thus to achieve the present covering process.

The outer surface of the car body formed by the present covering process can be suitably coated with an intermediate paint and/or topcoat paint etc.

According to the present covered metal plate and the present covering process mentioned above, the following effects can be obtained.

(1) As the present covered metal plate is mamde by covering the metal plate with more than two kinds of plastics layers, whose rate of elongation is different each other, its corrosion resistance, chippong resistance etc. are remarkably improved compared with a metal plate covered with a monolayered plastics layer.

(2) The present covered metal plate is excellent in finishing appearance such as smoothness etc., because its plastics layer is multilayered of more than two layers.

(3) In the present covering process the electrodeposition paint easily deposits thick at the boundary portion with the plastics covering film, the corrosion resistance of the portion is remarkably improved.

(4) According to the present covering process, outer cover parts such as hood panel, fender panel, door panel, luggage door panel etc. and further main body constituted from underbody, side member, roof, cowl, upper back, lower back etc. of a car body can be prepared by using the metal plate previously covered with plastics layer, therefore it is possible to reduce the consumption amount of the electrodeposition paint to be used in the next step to a large extent.

(5) In the present covering process, at least the outer surface of the outer cover parts is covered with plastics layer having a high volume specific resistance, therefore the area of the portion to be coated by electrodeposition (exposed metal portion) is small and consequently the throwing power increases and particularly the corrosion resistance of the edge surface portion is improved.

Then the present invention will be described more specifically by Examples and Comparative Examples. Parts and % are by weight and the film thickness of the coating film is that of the cured coating film.

1. Sample

Plastics Film (a) Polyethylene terephthalate (PET) film with rate of elongation (speed of elongation 20 mm/minute/20° C.) 65% and oxygen permeability $10^{-12}$ $cm^3.cm/cm^2.sec.cmHg$ at 25° C. (16 μm thick).

(b) Polyurethane film with rate of elongation (speed of elongation 20 mm/minute/20° C.) 215% and oxygen permeability $5\times10^{-11}$ $cm^3.cm/cm^2.sec.cmHg$ at 25° C. (20 μm thick).

(c) Hard polyvinyl chloride film with rate of elongation (speed of elongation 20 mm/minute/20° C.) 40% and oxygen permeability $5\times10^{-12}$ $cm^3.cm/cm^2.sec.cmHg$ at 25° C. (16 μm thick).

2. Examples and Comparative Examples

EXAMPLE 1

Both surfaces of the plastics film (b) (polyurethane film) are treated by corona discharge and a thermosetting polyester resin type adhesive (*1) is coated on one surface to a film thickness 7 μm, dried by heating at 120° C. for 30 seconds and the film is wound up. And both surfaces of the plastics film (a) (PET film) are treated by corona discharge and a thermosetting polyester resin type adhesive (*1) is coated on one surface to a film thickness 7 μm, dried by heating at 120° C. for 30 seconds and the film is wound up.

After a 0.8 mm thick metal plate, plated with alloyed molten zinc so that the plated amount be 45 g/m² (plated on both sides), is degreased and chemically treated with zinc phosphate ("PB #3080 Treatment", made by Nihon Parkerizing Co., Ltd.,trade name), the plastics film (b) coated with the above-mentioned adhesive and the plastics film (a) coated with the above-mentioned adhesive are stuck to one side of the metal plate in this order and heated at 200° C. for 10 minutes to obtain the present covered metal plate (a) on which both films are laminated. The results of the performance test are: chipping resistance ○; general portion corrosion resistance ○; image sharpness ○.

(*1) Thermosetting Polyester Resin Type Adhesive

An adhesive solution with solid content 30% obtained by mixing and dispersing 90 parts of "Elitel UE3200" (made by Unitika Ltd., trade name, polyester resin) and 10 parts of "Duranate TPA100" (made by Asahi Chemical Industry Co., Ltd., hexamethylene diisocyanate type polyisocyanate compound, trade name) in a mixed solvent (methyl ethyl ketone/toluene=50/50 weight ratio).

EXAMPLE 2

A thermosetting polyester resin type adhesive (*1) is coated on one surface of the plastics film (c) (hard polyvinyl chloride film) to a film thickness 7 μm, dried by heating at 120° C. for 30 seconds and the film is wound up.

After a 0.8 mm thick metal plate, plated with alloyed molten zinc so that the plated amount be 45 g/m² (plated on both sides), is degreased and chemically treated with zinc phosphate ("PB #3080 Treatment", made by Nihon Parkerizing Co., Ltd.,trade name), the plastics film (c) coated with the above-mentioned adhesive, the plastics film (b) coated with the above-mentioned adhesive and the plastics film (a) coated with the above-mentioned adhesive are stuck to one side of the metal plate in this order and heated at 200° C. for 10 minutes to obtain the present covered metal plate (b) on which 3-layered films are laminated in this order. The results of the performance test are: chipping resistance ○; general portion corrosion resistance ○; image sharpness ◎.

COMPARATIVE EXAMPLE 1

After a 0.8 mm thick metal plate, plated with alloyed molten zinc so that the plated amount be 45 g/m² plated on both sides), is degreased and chemically treated with zinc phosphate ("PB #3080 Treatment", made by Nihon Parkerizing Co., Ltd.,trade name), the plastics film (a) coated with the above-mentioned adhesive is stuck to one side of the metal plate and heated at 200° C. for 10 minutes to obtain the covered metal plate for comparison (c) on which a monolayered film is covered. The results of the performance test are: chipping resistance Δ; general portion corrosion resistance Δ; image sharpness Δ.

COMPARATIVE EXAMPLE 2

After a 0.8 mm thick metal plate, plated with alloyed molten zinc so that the plated amount be 45 g/m² (plated on both sides), is degreased and chemically treated with zinc phosphate ("PB #3080 Treatment", made by Nihon Parkerizing Co., Ltd.,trade name), the plastics film (b) coated with the above-mentioned adhesive is stuck to one side of the metal plate and heated at 200° C. for 10 minutes to obtain the covered metal plate for comparison (d) on which a monolayered film is covered. The results of the performance test are: chipping resistance Δ; general portion corrosion resistance X; image sharpness Δ.

EXAMPLE 3

A model of a main body (size is about ⅕ of the actual thing), consisting of underbody, side member, roof, cowl, upper back and lower back, was previously prepared by cutting, shaping and combining the present covered metal plate (a) obtained by the above-mentioned Example 1. Further, models of outer cover parts (car parts) (size is about ⅕ of the actual thing) such as hood, fender, door, luggage door etc. were prepared by cutting, shaping and combining the present covered metal plate (a).

A shell body was formed by fitting these outer cover parts to the main body and dipped into a cationic electrodeposition paint ("Elecron #9600 Gray", made by Kansai Paint Co., Ltd., trade name, epoxy resin type) bath to coat the exposed metal portion of the shell body by electrodeposition under the conditions of electrodeposition bath temperature 28° C., voltage 250V, and totally dipped current passing time 2 minutes. After washing with water, the electrodeposition coating film was cured by heating at 170° C. for 30 minutes. The film thickness of the flat portion of the electrodeposition coating film was 20 μm. The result of the performance test was: the corrosion resistance of the edge surface portion ○.

Performance test methods are as follows.

Chipping Resistance:

Tests were conducted on covered metal plates obtained in Examples 1, 2 and Comparative Examples 1, 2.

Using "Q-G-R Gravelometer" (made by Q Panel Co., Ltd., trade name) as a testing machine, about 50 g of No.7 crushed stones were blown onto the surface of the plastics layer at an angle of 90 at −20° C. by an air pressure of about 4 kg/cm². After that an adhesive cellophane tape was stuck on the plastics layer, and the state of chipping of the coating film from the portion of the plastics layer, on which the shock had been given, was visually observed, after rapidly peeling-off the adhesive tape. ○ shows that a little chipping of the plastics layer by shock was observed but there is no exposure of metal surface at all, Δ shows that much chipping of the plastics layer by shock was observed and there is a little exposure of metal surface, too, and X shows that much chipping of the plastics layer by shock is observed and there is much exposure of metal surface, too.

General Portion Corrosion Resistance:

Tests were conducted on covered metal plates obtained in Examples 1, 2 and Comparative Examples 1, 2.

A cross-cut was made to the film reaching to the ground surface with a knife and after conducting salt water spraying test according to JIS Z-2371 for 480 hours, the width of the generated rust or blistering (one side) from the cut position was observed.

○ shows that the maximum width of the generated rust or blistering is less than 2 mm from the cut position, Δ shows that the maximum width of the generated rust or blistering is 2–3 mm from the cut position, and X shows that the maximum width of the generated rust or blistering is more than 3 mm from the cut position.

Image Sharpness:

On the surface of the plastics layer of the covered metal plates obtained in Examples 1, 2 and Comparative Examples 1, 2, a topcoat paint ("LUGA-BAKE QM1 WHITE", made by Kansai Paint Co., Ltd., trade name, aminoalkyd resin type topcoat white organic solvent type paint) was coated so that the film thickness would be 40 μm and the coated film was cured by heating at 140° C. for 30 minutes. The image shrpness of these topcoat coating films were measured by using an image clarity-measuring equipment (made by Suga Tester Co., Ltd.). ⊚ shows that the measured value is higher than 80, ○ shows that the measured value is 75–80, Δ shows that the measured value is 70–75, and X shows that the measured value is less than 70.

Edge Surface Portion Corrosion Resistance:

After placing the model obtained in Example 3 in a salt water resistance spray test machine (35° C.) for 240 hours, the corrosion resistance at the edge surface portion of the cut position of the present covered metal plate of the outer surface portion of the outer cover parts of the shell body (acute angle portion) was observed. ○ shows that no generation of rust or blistering at the edge surface portion is observed at all, Δ shows that a little generation of rust or blistering at the edge surface portion is observed, and X shows that much generation of rust or blistering at the edge surface portion is observed.

What is claimed is:

1. A plastics-covered metal plate for car body in which one surface or both surfaces of the metal plate are covered by a laminate of at least two kinds of plastic films whose elongation rates are different from each other, the laminate comprising a plastic film (A) with smaller elongation rate at the upper side farther from the metal plate and a plastic film (B) with larger elongation rate at the lower side nearer to the metal plate, wherein the elongation rate of the plastic film (B) is larger than the elongation rate of the plastic (A) by at least 10%, and a plastic film (A) is further laminated at the lower plastic film (B), at the nearer side to the metal plate.

2. The plastics-covered metal plate set forth in claim 1 wherein the elongation rate of the plastic film (B) is larger than the elongation rate of the plastic film (A) by at least 50–200%.

3. The plastics-covered metal plate set forth in claim 1 wherein the elongation rate of the plastic film (A) is 1–100%.

4. The plastics-covered metal plate set forth in claim 1 wherein the elongation rate of the plastic film (A) is 5–70%.

5. The plastics-covered metal plate set forth in claim 1 wherein the oxygen permeability of the plastic film (A) in its single coating film form at 25° C. is less than $10^{-11}$ cm³.cm/cm².sec.cmHg.

6. The plastics-covered metal plate set forth in claim 1 wherein the oxygen permeability of the plastic film (A) in its single coating film form at 25° C. is less than $10^{-12}$ cm³.cm/cm².sec.cmHg.

7. The plastics-covered metal plate set forth in claim 1 wherein the plastic film is formed of a thermoplastic resin selected from the group consisting of polyolefin resin, polyester resin, polycarbonate resin, epoxy resin, vinyl acetate resin, vinyl chloride resin, fluorine-containing resin, polyvinyl acetal resin, polyvinyl alcohol resin, polyamide resin, polystyrene resin, acrylic resin, polyurethane resin, phenolic resin, polyether resin, and cellulose type resin.

8. The plastics-covered metal plate set forth in claim 1 wherein the thickness of each plastic film is in the range of 1–100 μm.

9. The plastics-covered metal plate set forth in claim 1 wherein the thickness of each plastic film is in the range of 5–50 μm.

10. The plastics-covered metal plate set forth in claim 1 wherein the thickness of each plastic film is in the range of 5–120 μm.

11. The plastics-covered metal plate set forth in claim 1 wherein an adhesive exists between a plastic film and the metal plate and between each other plastic film.

12. A process of covering a car body which comprises forming a shell body of a car body from partly or totally a plastics-covered metal plate in which one surface or both surfaces of a metal plate are covered by a laminate of at least two kinds of plastic films whose elongation rates are different from each other, the laminate comprising a plastic film (A) with smaller elongation rate at the upper side farther from the metal plate and a plastic film (B) with larger elongation rate at the lower side nearer to the metal plate, wherein the elongation rate of the plastic film (B) is larger than the elongation rate of the plastic film (A) by at least 10%, and a plastic film (A) is further laminated at the lower plastic film (B) at the nearer side to the metal plate and then electrodeposition coating a portion of the shell body where metal is exposed.

13. The process of covering a car body set forth in claim 12 wherein a main body and outer cover parts of the car body are prepared by cutting, shaping and combining the plastics-covered metal plate and then forming a shell body by assembling them.

14. The process of covering a car body set forth in claim 12 wherein the outer cover parts of the car body are prepared by cutting, shaping and combining the plastics-covered metal plate and then forming a shell body by assembling them with a main body.

15. The process of covering a car body set forth in claim 12 wherein electrodeposition coating is conducted by using a cationic electrodeposition paint.

16. A car body comprising partly or totally the plastics-covered metal plate set forth in claim 1.

* * * * *